Figure 1:
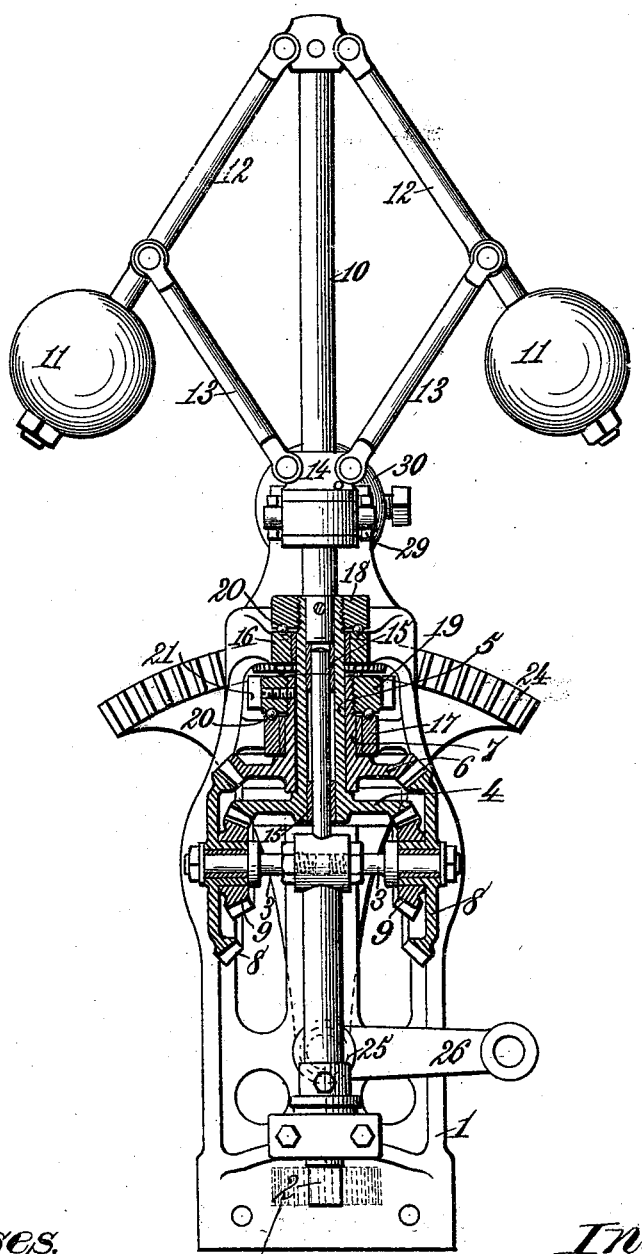

(No Model.) 2 Sheets—Sheet 1.

J. DOW.
SPEED GOVERNOR FOR MOTORS.

No. 555,438. Patented Feb. 25, 1896.

Witnesses.
Robert Corrett.
Geo. W. Rea.

Inventor.
Josiah Dow.
By James L. Norris.
Atty.

(No Model.) 2 Sheets—Sheet 2.
J. DOW.
SPEED GOVERNOR FOR MOTORS.
No. 555,438. Patented Feb. 25, 1896.
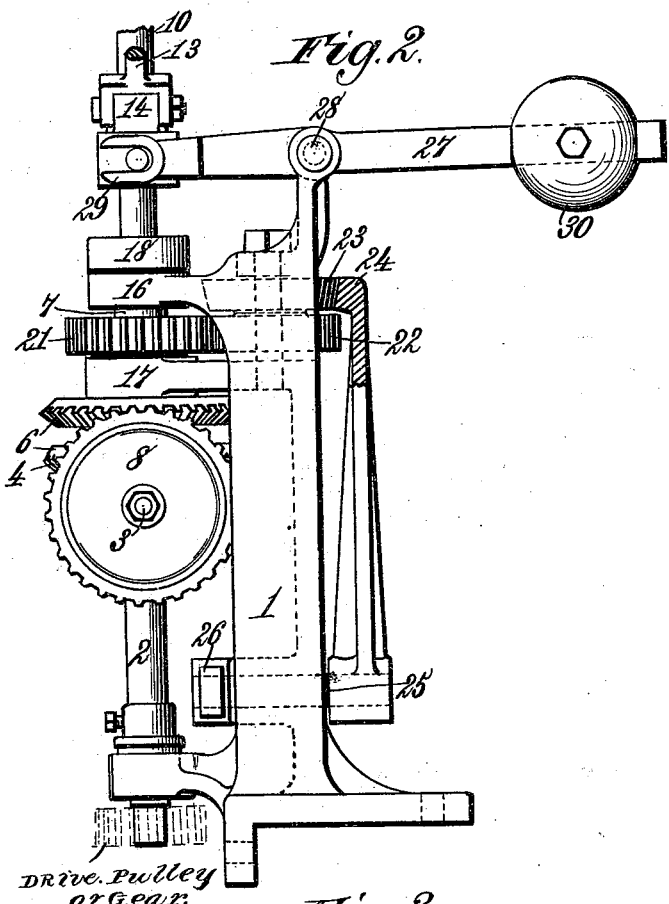
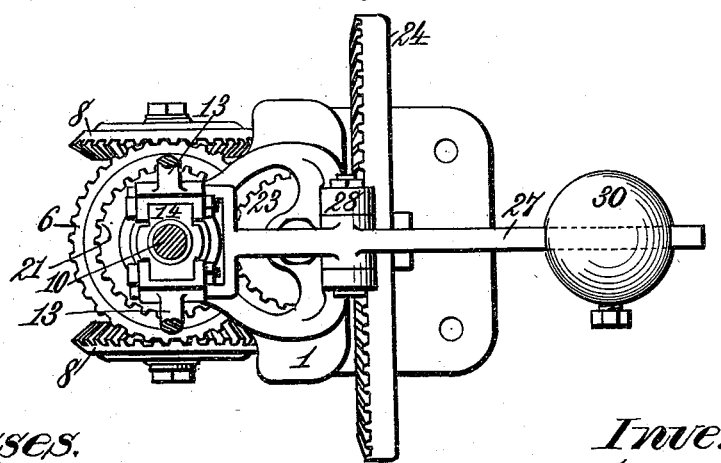
Witnesses.
Robert Everett.
Geo. N. Rea.
Inventor.
Josiah Dow.
By James L. Norris.
Atty.

UNITED STATES PATENT OFFICE.

JOSIAH DOW, OF PHILADELPHIA, PENNSYLVANIA.

SPEED-GOVERNOR FOR MOTORS.

SPECIFICATION forming part of Letters Patent No. 555,438, dated February 25, 1896.

Application filed September 26, 1895. Serial No. 563,763. (No model.)

*To all whom it may concern:*

Be it known that I, JOSIAH DOW, a citizen of the United States, residing at Philadelphia, in the county of Philadelphia and State of Pennsylvania, have invented new and useful Improvements in Speed-Governors for Motors, of which the following is a specification.

My invention relates to differential speed-governors for steam-engines and other motors, and has for its object to obtain the desired differentiation with great steadiness of action and sensitiveness to every change of speed from the normal standard, so that the cut-off will be controlled without overrunning, rebounding, or what is familiarly called "hunting," and with extreme delicacy or great rapidity, as the needs of the motor may require.

In the annexed drawings, illustrating the invention, Figure 1 is a partly-sectional elevation of my improved speed-governor. Fig. 2 is an elevation at a right angle to the preceding figure, and Fig. 3 is a plan.

Referring to the drawings, the numeral 1 designates a frame, and 2 the main rotary shaft, through which motion is derived from the engine or motor. This main shaft 2 is provided with two horizontally-arranged radial arms 3, firmly attached to and revolving with said shaft.

The main shaft 2 may be rotated by power obtained from the engine or motor in any suitable manner; but in Fig. 2 I have indicated by dotted lines a pulley or gear-wheel on the lower end of the shaft, which can be geared up to the engine or motor for the purpose of rotating the shaft.

There is supported in the frame 1 a horizontally-placed miter-gear 4, having a vertically-extended hub or sleeve 5 loosely surrounding the upper portion of the main shaft 2, and outside the sleeve 5 there is another horizontally-placed miter-gear 6, provided with a sleeved hub 7, through which it is also supported in the governor-frame, as hereinafter explained. The two gears 4 and 6 are thus concentrically sleeved upon the rotary shaft 2, but are otherwise independent of each other and of the said shaft. The uppermost horizontal gear 6 has meshed therewith and gyrating about its circumference two vertically-arranged miter-gears 8 of equal diameter with the gear 6, and which are mounted to revolve upon the outer ends of the arms 3, carried by the main shaft. These gyrating gears 8 have firmly keyed to their hubs, and therefore revolving exactly with them, the subsidiary vertically-arranged miter-gears 9, which are placed in mesh with the horizontal miter-gear 4, that is of larger diameter than said subsidiary gears.

For convenience of illustration with the present construction the horizontal gear 4 is shown as double the diameter of the subsidiary vertical gears 9; but any other suitable proportion may be provided.

The vertically-elongated sleeved hub 5 of the horizontal gear 4 is extended upward beyond the upper end of the main shaft 2 and there receives and is firmly connected to a vertical shaft 10, upon which are mounted the fly-balls 11 and their supporting-arms 12 13 and collar 14, the parts being so arranged that the axes of the gear 4 and shafts 2 and 10 are identical.

In the sleeved hub 5 of the gear 4 are bushings 15, surrounding the main shaft 2 for the purpose of keeping it steadily in line; but the shaft 2 does not directly control the movement of the gear 4 in any way, nor the shaft 10 upon which the fly-balls are carried vertically above it, the said main shaft 2 being entirely free to turn within the sleeved hub of the gear 4 without controlling any part of the mechanism except through the gyrating gears 8 and 9 carried upon the arms 3 that project radially from and move with the main shaft. The sleeved vertical hub 7 of the gear 6 is also perfectly free to turn outside of the sleeved hub 5 of the gear 4, neither giving to nor receiving motion from it.

The bearings 16 and 17 for the sleeved hubs of the gears 4 and 6 permit the said hubs 5 and 7 to turn freely about their own axes, the bearing 16 holding the hub 5 of the gear 4 and the bearing 17 holding the hub 7 of the gear 6; and in order to facilitate easy motion of the gears 4 and 6 the said bearings and the collars 18 and 19 secured to the respective gear-hubs are each provided with grooved channels for reception of antifriction-balls 20, by which the friction is greatly reduced.

It will be seen that when motion is communicated to the main shaft 2 the gears 8 upon the arms 3 will gyrate about the axis of that shaft, which being also the unattached axis of the gear 6 they consequently also gyrate about the circumference of that gear with which they are in mesh. If the gear 6 were firmly held at rest and the gears 8 subjected to no resistance through the gears 9 and 4 the gears 8 would revolve once upon their own axes while passing once around the gear 6, the said gears 6 and 8 being of equal diameters; and the subsidiary gears 9 would also necessarily turn once upon their own axes, the gears 8 and 9 being keyed together. The subsidiary gears 9, however, always moving exactly with the gears 8, will meet with resistance from the force necessary to gyrate the fly-balls 11 by means of the horizontal gear 4, to the sleeve of which the said fly-balls, through their shaft 10, are attached, and as the gears 9 are of one-half the diameter of the gear 4, which meshes with them, they may turn once upon their own axes, while at the same time they will carry the gear 4, and with it the fly-balls, through half of one revolution, while themselves making one gyration about the main shaft; but the turning of the gears 9 once on their own axes causes their companion gears 8 to also turn once upon their own axes while passing once in gyration about the gear 6, and this would leave the said gear 6 completely at rest, although meshed with the gears 8. Thus it will be understood that for the normal rate of revolution of the engine or other motor the fly-balls 11 must be of such weight and such radial position in gyration that the force required to keep them at a set rate of motion shall be just sufficient to oblige the subsidiary gears 9 to carry with them in their gyration the gear 4, and consequently the fly-balls, through the half of one revolution balanced against the resistance of the cut-off connections of the engine, while the said gears 9 go through one gyration about the gear 4 and main shaft—that is, with the several gears proportioned as shown, the fly-balls will make just one-half as many gyrations as the gears 8 and 9 when the gear 6 is left at rest, because the gear 4 being double the diameter of the gears 9, they may carry it with them to the extent of one-half of a revolution, and yet themselves turn a whole revolution upon their own axes, carrying the gears 8 with them.

It is a feature of this governor that the fly-balls 11 are not employed or availed of at all after the usual manner or principle of action common in the ordinary well-known form of centrifugal governor in which the rising and falling of the balls and connected collar effect the required changes in the cut-off. In this governor, on the contrary, neither the raising and lowering of the collar 14 upon the shaft 10, nor the expansive action of the balls themselves, have any direct connection whatever with the cut-off mechanism; but these fly-balls 11, in their resistance to gyrating motion, governed by the laws well known to control the pendulum and kindred balancing devices, act in much the same manner, through their resistance to change of motion in the gear 4, as does the familiar chronometer-balance. As the resistance to motion of the fly-balls, when gyrating through a track of unvarying diameter, is always exactly the same at the same rate of speed, as this resistance is made exactly the resistance of the engine cut-off and connections, and as the motion of the fly-balls is attained through the resistance between the gears 4 and 9, the said gears 9 always moving faster about the main axis or shaft 2 than the gear 4 does, a change in the number of revolutions of the engine from the normal will not affect the normal gyrations of the fly-balls 11, unless the rate of speed becomes so very much less as not to give the gears 9 the surplus of movement required to keep the gear 4 up to the normal number of revolutions, in which case the action, through the gear 6 and cut-off connections, toward the longest cut-off would take place with great rapidity. Should the speed turn suddenly toward a great excess, as the fly-balls would move no faster, being driven only by the resistance between the gears 4 and 9, and not by direct action of their teeth in revolution, the movement toward the shortest or complete cut-off would be effected with as great rapidity—that is, with a motion of the shaft 2 slower than the normal speed—the subsidiary gears 9 will receive less movement upon their own axes after yielding the necessary force to maintain the fly-balls at their normal speed, and consequently the gears 8 will not make a complete revolution upon their own axes while passing once around the gear 6, and they will consequently carry the gear 6 with them through a greater or less arc of movement in their gyration; but should the speed of the main shaft 2 become greater than the normal then the gears 9 will receive more than one revolution upon their own axes while gyrating once about the main axis, carrying with them the gears 8, which will transmit the excess of movement to the gear 6, causing it to revolve backward or in the opposite direction to the gyration of the gears 8 to the extent of the excess over what is necessary to the turning of said gears 8 once upon their own axes while gyrating once about the gear 6. It will thus be seen that the gear 6 is forced to turn backward from the direction of gyration of the gears 8 and 9 when the speed of the engine or other motor becomes greater than the normal, and that it turns with the direction of that gyration when the speed of the engine falls below the normal; also that regardless of the duration of this turning backward or forward of the gear 6 the new point of cut-off will be steadily maintained on the normal rate of speed being restored, because the gear 6, at the normal rate of speed, remains without any movement, the balance with the fly-balls 11 being such that the gears 8 turn exactly once on their own axes while gyrating once about said gear 6 through which the cut-off is controlled.

The movements of the horizontal gear 6 in one direction or the other and its balanced rest at the normal speed are transmitted through a spur-gear 21 on the sleeve 7 or its collar 19 to a spur-gear 22 and accompanying pinion 23, the two last of which are firmly keyed together upon the same axis and mounted therewith in or upon the governor-frame. The pinion 23 may engage an arc-rack 24, as shown, provided with a pivot or fulcrum 25, with which may connect a crank-arm 26 or other suitable device for connecting with a cut-off or valve-gear. The rack 24 may be obviously made straight and arranged in immediate connection with the cut-off or valve-gear, if preferred, or the pinion 23 may be made larger and placed on the same axis as the gear 6, the gears 21 and 22 being then dispensed with.

As the regulating effect of the fly-balls 11 depends directly upon their weight with relation to the diameter of their circle of gyration and the square of the linear velocity of gyration, it is evident that the normal rate of speed which is determined by them will be greatly affected by the positions of the balls in diametrical distance from the shaft 10, about which they gyrate, and that the forcible raising or lowering of the collar 14 will afford the means of holding them in such diametrical position as may be desired to regulate the normal speed, an outward movement of the balls increasing their resistance to gyration and consequently permitting fewer revolutions through the resistance of the subsidiary gears 9, which is a fixed quantity derived from the resistance of the cut-off gearing and connections, while conversely an inward movement of the balls to a lesser radial distance will decrease their resistance to gyration and permit a greater number of revolutions. To better secure this regulation and also permit it to be effected while the governor mechanism is in motion, a weighted lever-arm 27 is arranged to control the position of the collar 14 and connected fly-balls. The lever 27 is fulcrumed at 28 on the governor-frame 1 and is provided at one end with jaws 29 to engage lugs on the collar 14. On the other end of the lever 27 is a movable weight 30. This weighted lever 27 controls the collar 14 and through it the position of the fly-balls 11 as the weight 30 is moved inward or outward.

It may be noted that the action of the gears 8 when turning the gear 6 to effect a longer or a shorter cut-off is always steadily in one direction until the normal speed has been restored, the movement being very slight and slow, while the variation from the normal is slight, greater and more rapid when the variation is greater, and that the movement of the gear 6 still in the same direction will decrease in proportion as the speed approaches the normal until it will entirely come to rest as the normal rate is reached, leaving the gear 6, and consequently the cut-off, in the new position without any opportunity for rebound or hunting, as is commonly the case with the usual forms of fly-ball governors which do not set up a new point of cut-off, but continually attempt to correct the old one.

The fly-balls 11 are held in motion, through the connected train of gearing, by the resistance of the cut-off or valve-gear connections, but have no actuating connection with the cut-off or valve-gear, and they act only as a chronometrical balance to set a fixed number of revolutions.

With every change of speed from the normal standard to which the engine or motor may be adjusted the governor mechanism will act promptly, steadily, and with great sensitiveness to transmit the required changes as sensitively and directly to the cut-off, either with great delicacy of movement or great rapidity, as the immediate needs of the engine may determine.

What I claim as my invention is—

1. In a governor for motors, the combination of a rotary shaft provided with oppositely-arranged radial arms, loosely-mounted miter-gears sleeved concentrically upon said shaft but otherwise independent of each other and said shaft, gyrating miter-gears mounted to revolve on the arms of the said shaft in mesh with one of the concentrically-sleeved gears and of equal diameter therewith, subsidiary gyrating miter-gears keyed to the hubs of the first-named gyrating gears and in mesh with the other concentrically-sleeved gear and of less diameter than the same, fly-balls mounted on a shaft fixed to and carried by the sleeve of the gear that meshes with the subsidiary gyrating gears, and means for connecting with cut-off devices the gear that is meshed with the other gyrating gears, substantially as described.

2. In a governor for motors, the combination of a horizontally-mounted miter-gear having a vertically-extended sleeve or hub, a shaft fixed to and carried by said hub, fly-balls mounted on said shaft, means for regulating or controlling the radial distance of the fly-balls from their said shaft, a horizontally-mounted miter-gear sleeved on the hub of the gear that carries the fly-balls and connected with mechanism for actuating or controlling a valve-gear or cut-off, gyrating miter-gears of equal diameter with the gear that connects with the cut-off and adapted to mesh with and actuate said gear in opposite directions, subsidiary gyrating miter-gears keyed to the hubs of the first-named gyrating gears and of less diameter than the gear that carries the fly-balls and meshed therewith, and a rotary shaft having radial arms on which the gyrating gears are mounted, substantially as described.

3. In a governor for motors, the combination of a loosely-mounted and horizontally-arranged gear connected with mechanism for controlling a valve-gear or cut-off, a rotary shaft provided with oppositely-arranged radial arms carrying gyrating gears in mesh with the gear that connects with the cut-off and of equal diameter therewith, the fly-balls, a loosely-mounted and horizontally-arranged gear having an elongated hub connected with and carrying said fly-balls, subsidiary gyrating gears keyed to the hubs of the first-named gyrating gears and in mesh with the gear that carries the fly-balls and of less diameter than the same, and means for controlling the radial movements of the fly-balls, substantially as described.

4. In a governor for motors, the combination of a loosely-mounted and horizontally-arranged gear provided with an upward-extended sleeved hub, a shaft fixed to and carried by said hub, fly-balls carried on said shaft, a loosely-mounted and horizontally-arranged gear sleeved on the hub of the ball-carrying gear and connected with mechanism for actuating or controlling a valve-gear or cut-off, a rotary shaft provided with radial arms, gyrating gears mounted on said arms in mesh with the cut-off-actuating gear and of equal diameter therewith, and subsidiary gyrating gears of less diameter than the ball-carrying gear and meshed therewith, substantially as described.

5. In a governor for motors, the combination of a rack to connect with mechanism for controlling a valve-gear or cut-off, a loosely-mounted and horizontally-arranged gear through which said rack is actuated by intermediate gearing, the fly-balls, a loosely-mounted and horizontally-arranged gear by which the fly-balls are carried, vertically-arranged gyrating gears of equal diameter with the gear for actuating the cut-off and meshed therewith, vertically-arranged subsidiary gyrating gears keyed to the hubs of the first-named gyrating gears to mesh with the fly-ball-carrying gear and of less diameter than said gear, and a rotary shaft having oppositely-arranged radial arms on which the gyrating gears are mounted, substantially as described.

6. In a governor for motors, the combination of a rotary shaft having oppositely-arranged radial arms, gyrating gears mounted vertically on said arms and having subsidiary gyrating gears keyed to their hubs, two horizontally-arranged and loosely-mounted gears concentrically sleeved on said rotary shaft but independent thereof, the said horizontally-arranged gears being in mesh with the vertically-arranged gyrating gears, means for actuating a cut-off mechanism from one of said horizontally-arranged gears, fly-balls carried by a shaft fixed to the other horizontally-arranged gear, a collar loose on said shaft and connected with the fly-balls, and a lever connected with said collar and provided with an adjustable weight to regulate or control the radial movement of the fly-balls, substantially as described.

7. In a governor for motors, the combination of the frame 1, the rotary shaft 2 provided with radial arms 3, the gyrating gears 8 mounted on said arms and having subsidiary gyrating gears 9 keyed to their hubs, the gear 4 loosely sleeved to the shaft 2 in mesh with the gears 9 and of greater diameter than the same, the gear 6 loosely sleeved on the hub of the gear 4 and in mesh with the gears 8 and of equal diameter therewith, the rack 24 for actuating or controlling a cut-off, gearing intermediate said rack and the gear 6, the shaft 10 fixed to and carried by the hub of the gear 4, the collar 14 loose on said shaft 10, fly-balls 11 connected with said collar and carried by the said shaft 10, the lever 27 connected with said collar and the movable weight 30 on said lever, substantially as described.

8. In a governor for motors, a chronometric balance to set a fixed number of revolutions and held in motion by the resistance of differentially-controlled mechanism intermediate said chronometric balance and the cut-off or valve-gear connections, substantially as described.

9. In a governor for motors, a chronometric balance comprising fly-balls not in actuating connection with the cut-off or valve-gear and held in motion through the resistance of differentially-controlled gearing intermediate said chronometric balance and the cut-off or valve-gear connections, substantially as described.

10. In a governor for motors, a chronometric balance held in motion through the resistance of differentially-controlled cut-off gearing, not the direct tooth-by-tooth action of gears, the said chronometric balance having no actuating connection with the cut-off mechanism and provided with means of adjustment to set a fixed number of revolutions, substantially as described.

In testimony whereof I have hereunto set my hand in presence of two subscribing witnesses.

JOSIAH DOW.

Witnesses:
H. L. ROHRMAN,
H. PATTON.